US009251520B2

(12) United States Patent
Shen et al.

(10) Patent No.: US 9,251,520 B2
(45) Date of Patent: Feb. 2, 2016

(54) DISTRIBUTING MOBILE ADVERTISEMENTS

(75) Inventors: Si Shen, San Francisco, CA (US);
Kentaro Tokusei, Los Altos, CA (US);
Weipeng Paul Yan, Redwood City, CA (US); Giao Nguyen, Sacramento, CA (US); Steve Miller, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 1413 days.

(21) Appl. No.: 11/360,015

(22) Filed: Feb. 22, 2006

(65) Prior Publication Data

US 2007/0198339 A1 Aug. 23, 2007

(51) Int. Cl.
*G06Q 30/00* (2012.01)
*G06Q 30/02* (2012.01)

(52) U.S. Cl.
CPC ............ *G06Q 30/02* (2013.01); *G06Q 30/0267* (2013.01); *G06Q 30/0277* (2013.01)

(58) Field of Classification Search
CPC ................................ G06Q 30/00; G06Q 30/02
USPC ...................... 705/7, 14; 707/751, 26.1, 26.8; 455/412.1, 414.1, 414.3, 466, 403, 455/414; 715/854
See application file for complete search history.

(56) References Cited

U.S. PATENT DOCUMENTS

| 5,539,395 | A | 7/1996 | Buss et al. |
| 5,724,521 | A | 3/1998 | Dedrick |
| 5,740,549 | A | 4/1998 | Reilly et al. |
| 5,848,397 | A | 12/1998 | Marsh et al. |
| 5,948,061 | A | 9/1999 | Merriman |
| 6,026,368 | A | 2/2000 | Brown et al. |
| 6,044,376 | A | 3/2000 | Kurtzman, II |
| 6,078,914 | A | 6/2000 | Redfern |
| 6,084,628 | A | 7/2000 | Sawyer |
| 6,144,944 | A | 11/2000 | Kurtzman, II et al. |
| 6,167,382 | A | 12/2000 | Sparks et al. |
| 6,219,680 | B1 | 4/2001 | Bernardo et al. |
| 6,219,696 | B1 | 4/2001 | Wynblatt et al. |
| 6,269,361 | B1 | 7/2001 | Davis et al. |
| 6,317,781 | B1 | 11/2001 | De Boor et al. |
| 6,332,127 | B1 | 12/2001 | Bandera et al. |
| 6,401,075 | B1 | 6/2002 | Mason et al. |

(Continued)

FOREIGN PATENT DOCUMENTS

| JP | 11-265347 | 9/1999 |
| JP | 2001-331409 | 11/2001 |

(Continued)

OTHER PUBLICATIONS

Reexamination of U.S. Appl. No. 95/001,073, filed Sep. 30, 2004, Stone et al.

(Continued)

*Primary Examiner* — Bennett Sigmond
*Assistant Examiner* — Marilyn G Macasiano
(74) *Attorney, Agent, or Firm* — Foley & Lardner LLP; John D. Lanza

(57) ABSTRACT

A method of generating relevant promotional materials for transmission to a mobile device includes receiving a query from the mobile device, identifying a plurality of advertisements associated with an advertiser-directed delivery parameter that match parameters for the mobile device, and generating a response to the query comprising search results and the plurality of advertisements.

18 Claims, 10 Drawing Sheets

(56) References Cited

U.S. PATENT DOCUMENTS

| | | | |
|---|---|---|---|
| 6,446,261 | B1 | 9/2002 | Rosser |
| 6,470,381 | B2 | 10/2002 | De Boor et al. |
| 6,487,538 | B1 | 11/2002 | Gupta et al. |
| 6,647,257 | B2 | 11/2003 | Owensby |
| 6,647,269 | B2 | 11/2003 | Hendrey et al. |
| 6,822,663 | B2 * | 11/2004 | Wang et al. ............... 715/854 |
| 6,856,673 | B1 | 2/2005 | Banks et al. |
| 6,950,804 | B2 | 9/2005 | Strietzel |
| 6,985,882 | B1 | 1/2006 | Del Sesto |
| 6,993,326 | B2 | 1/2006 | Link, II et al. |
| 7,027,801 | B1 * | 4/2006 | Hall et al. ............... 455/412.1 |
| 7,039,599 | B2 | 5/2006 | Merriman |
| 7,136,875 | B2 | 11/2006 | Anderson et al. |
| 7,216,292 | B1 | 5/2007 | Snapper et al. |
| 7,366,683 | B2 | 4/2008 | Altberg et al. |
| 7,477,909 | B2 | 1/2009 | Roth |
| 7,487,112 | B2 * | 2/2009 | Barnes, Jr. ............... 705/26.8 |
| 7,548,915 | B2 | 6/2009 | Ramer et al. |
| 7,606,840 | B2 | 10/2009 | Malik |
| 7,702,318 | B2 | 4/2010 | Ramer et al. |
| 7,730,021 | B1 | 6/2010 | Morse et al. |
| 7,734,556 | B2 | 6/2010 | Tan et al. |
| 7,743,093 | B2 | 6/2010 | Damour et al. |
| 7,769,764 | B2 * | 8/2010 | Ramer et al. ............... 707/751 |
| 7,809,603 | B2 | 10/2010 | Steelberg et al. |
| 7,831,658 | B2 | 11/2010 | Khopkar et al. |
| 8,001,107 | B2 | 8/2011 | Venkataramanujam |
| 2002/0042829 | A1 | 4/2002 | Mizuhara et al. |
| 2002/0046104 | A1 * | 4/2002 | Kaddeche et al. ............... 705/14 |
| 2002/0077130 | A1 | 6/2002 | Owensby |
| 2002/0091571 | A1 | 7/2002 | Thomas et al. |
| 2002/0095333 | A1 | 7/2002 | Jokinen et al. |
| 2002/0103698 | A1 | 8/2002 | Cantrell |
| 2002/0128908 | A1 | 9/2002 | Levin et al. |
| 2002/0160793 | A1 * | 10/2002 | Pradhan et al. ............... 455/466 |
| 2002/0165773 | A1 | 11/2002 | Natsuno et al. |
| 2003/0014307 | A1 * | 1/2003 | Heng ............... 705/14 |
| 2003/0032409 | A1 * | 2/2003 | Hutcheson et al. ............... 455/414 |
| 2004/0034561 | A1 | 2/2004 | Smith |
| 2004/0043770 | A1 | 3/2004 | Amit et al. |
| 2004/0044565 | A1 | 3/2004 | Kumar et al. |
| 2005/0065806 | A1 | 3/2005 | Harik |
| 2005/0080665 | A1 | 4/2005 | Bowman-Amuah |
| 2005/0222903 | A1 | 10/2005 | Buchheit et al. |
| 2005/0251820 | A1 | 11/2005 | Stefanik et al. |
| 2005/0278743 | A1 | 12/2005 | Flickinger et al. |
| 2006/0004627 | A1 | 1/2006 | Baluja |
| 2006/0149624 | A1 | 7/2006 | Baluja et al. |
| 2006/0217110 | A1 * | 9/2006 | Othmer ............... 455/414.1 |
| 2007/0136255 | A1 | 6/2007 | Rizzo et al. |
| 2007/0184820 | A1 * | 8/2007 | Marshall ............... 455/414.3 |
| 2007/0239530 | A1 | 10/2007 | Datar et al. |
| 2007/0264987 | A1 * | 11/2007 | Gupta et al. ............... 455/414.3 |
| 2007/0271139 | A1 * | 11/2007 | Fiorini ............... 705/14 |
| 2007/0271501 | A1 | 11/2007 | Vasilik |
| 2008/0109285 | A1 * | 5/2008 | Reuther et al. ............... 705/7 |
| 2008/0140476 | A1 | 6/2008 | Anand et al. |
| 2009/0070413 | A1 | 3/2009 | Priyadarshan et al. |

FOREIGN PATENT DOCUMENTS

| | | |
|---|---|---|
| JP | 2002-073666 | 3/2002 |
| JP | 2002/099822 | 4/2002 |
| JP | 2002/132827 | 5/2002 |
| JP | 2002-140611 | 5/2002 |
| JP | 2002/169744 | 6/2002 |
| JP | 2002/170027 | 6/2002 |
| JP | 2002-304352 | 10/2002 |
| JP | 2003-223378 | 8/2003 |
| JP | 2003-271508 | 9/2003 |
| JP | 2003-281026 | 10/2003 |
| JP | 2003/337893 | 11/2003 |
| JP | 2004-094895 | 3/2004 |
| JP | 2004-192284 | 7/2004 |
| JP | 2007-515018 | 6/2007 |
| KR | 2002/69767 | 9/2002 |
| KR | 2003/39736 | 5/2003 |
| KR | 10-2003-0046289 | 6/2003 |
| KR | 10-2004-0039249 | 5/2004 |
| WO | WO97/21183 | 6/1997 |
| WO | WO 97/21183 | 6/1997 |
| WO | 01/93138 | 12/2001 |
| WO | WO 02/23444 | 3/2002 |
| WO | 2004/079522 | 9/2004 |
| WO | WO 2004/079522 | 9/2004 |
| WO | 2005/065190 | 7/2005 |
| WO | WO2006/004800 | 1/2006 |
| WO | WO2006/004860 | 1/2006 |

OTHER PUBLICATIONS

Reexamination of U.S. Appl. No. 95/001,061, filed Sep. 3, 2002, Stone et al.
Reexamination of U.S. Appl. No. 95/001,069, filed Jul. 11, 2002, Dean et al.
Reexamination of U.S. Appl. No. 95/001,068, filed Dec. 7, 2002, Stone et al.
Ad-Star.com website archive from www. Archive.org, Apr. 12, 1997 and Feb. 1, 1997.
Baseview Products, Inc., ClassManagerPro Administration Manual v. 1.0.5, Feb. 1, 1997.
Information Access Technologies, Inc., Aaddzz.com website archive from www. Archive.org, archived on Jan. 30, 1998.
Notification of preliminary rejection for Korean patent application No. 10-2007-7002383 mailed Jun. 10, 2009 (5 pgs.) with translation (5 pgs.).
Notice of reasons for rejection for Japanese patent application No. 2007-519407mailed Jul. 7, 2009 (3 pgs.) with translation (4 pgs.).
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5., Feb. 1, 1997.
Ad-Star.com website archive from www.Archive.org., Apr. 12, 1997 and Feb. 1, 1997.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
Reexamination of U.S. Appl. No. 95/001,068, Stone et al.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Zeff, R. et al., Advertising on the Internet, 2$^{nd}$ Ed., John Wiley & Sons, 1999.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.
Statement Regarding References in 1449 Form.
Canadian Office Action to Canadian Patent Application No. 2,572,471, dated Mar. 16, 2009 (4 pgs.).
"eStarts Push to Talk: The most popular click to call service in the world," downloaded from http://www.estara.com on Jun. 29, 2004, 2 pgs.
Tedeschi, Bob, "Transforming Clicks Into Rings," (Jun. 7, 2004) downloaded from www.nytimes.com on Jun. 6, 2004, 3 pgs.

(56) References Cited

OTHER PUBLICATIONS

"Ingenio: Click to Call Solutions," downloaded from http:ingenio.com/documents/corpinfo/clicktocall.asp?TF=1 on Jun. 29, 2004, 3 pgs.
PCT/ISA/220, Notification of Transmittal of the International Search Report and the Written Opinion of the International Searching Authority, or the Declaration for PCT/US05/23162, sent via facsimile on Dec. 22, 2006 (2 pgs.).
Examiner's First Report to Australian Patent Application No. 2005260566, dated Mar. 4, 2008 (2 pgs.).
PCT/ISA/220, Notification of Transmittal of the International Search Report and the Written Opinion of the International Searching Authority, or the Declaration for PCT/US05/23162, mailed Feb. 5, 2007 (2 pgs.).
PCT/ISA/237, Written Opinion of the International Searching Authority for PCT/US05/23162, mailed Feb. 5, 2007 (7 pgs.).
Jones, Matt et al., "Improving Web interaction in small displays", *Computer Networks*, vol. 31, pp. 1129-1137 (May 17, 1999).
"Best practices for creating adaptive user interfaces with the mobile Internet toolkit", Microsoft Corporation, Dec. 206 (pp. 1-16).
Page to Karima email (1 pg.), Jan. 12, 2006.
Morton to Baluja email (1 pg.), Jan. 12, 2006.
Notice of Preliminary Rejection for Korean Patent Application No. 10-2007-7002383, mailed Jun. 10, 2008 (5 pgs.) with translation (5 pgs.).
Notice of Final rejection for Korean Patent Application No. 10-2007-7002383, mailed Apr. 22, 2010 (with english translation).
Office Action in Chinese Patent Application No. 2005-80025878.X, dated May 7, 2010 (with english translation).
Decision of rejection for Japanese Patent Application No. 2007-519407, mailed Feb. 23, 2010 (with english translation).
Int'l Search Report in Application No. PCT/US07/62577, dated Jan. 9, 2008, (incl Written Opinion dated Jan. 9, 2008).
Int'l Preliminary Report on Patentability in Application No. PCT/US07/062577, dated Aug. 26, 2008 (incl. Written Opinion dtd Jan. 9, 2008).
Int'l Preliminary Report on Patentability in Application No. PCT/US05/023023, dated Jan. 9, 2007 (incl. Written Opinion dated Oct. 23, 2006).
International Search Report in Application No. PCT/US05/023023, dated Oct. 23, 2006.
Int'l Preliminary Report on Patentability in Application No. PCT/US05/23162, dated Feb. 28, 2007, (incl. Written Opinion dated Feb. 5, 2007).
International Search Report in Application No. PCT/US05/023162, dated Feb. 5, 2007.
Office Action in U.S. Appl. No. 12/039,682, dated Oct. 13, 2011.
Decision of Rejection, Japanese application No. 2008-556543, mailed Nov. 6, 2012, with English Translation, 4 pages.
Japanese Non-Final Office Action, Notice of Reasons for Rejection in JP Patent Application No. 2008-556543, mailed on Feb. 21, 2012, 5 pages.
Office Action in Canadian Application No. 2,643,143, mailed Jan. 7, 2014, 3 pages.
Office Action in Japanese Application No. 2013-044222, mailed Mar. 31, 2014, 4 pages (with English translation).
Office Action in Korean Application No. 10-2008-7023104, mailed Jun. 25, 2014, 11 pages (with English translation).
Office action mailed Dec. 3, 2013 in corresponding Japanese Application No. 2013-44222, 12 pgs.
Office Action issued in Japanese Application No. 2013-44222 on Jun. 29, 2015, 15 pages (with English translation).

\* cited by examiner

| Top Ads | Bottom Ads |
|---|---|
| Google<br><br>[Ad] Ipod sale – ipod on sale – Call<br><br>Web results:* 'ipod'<br>Results 1 – 10 of about 169,000,000.<br>1 Apple – iPod family – Pocket-sized ultralight hard-drive based device. Includes technical specifications, – www.apple.com/ipod/<br>2 All things iPod, iTunes and beyond \| iLounge – | dash of color to your iPod with iPod Socks, the year's coziest ... – store.apple.com/.../A<br><br>10 Home-Apple iPod Settlement – Contains the official notice explaining the lawsuit for battery life problems in – www.appleipodsettlement.com/<br>Next<br><br>[Ad] Ipod on sale – ipod on sale – ipod sale.com<br>*Pages have been adapted for your mobile phone. Learn more |

FIG. 4B

| Mobile URL + C2C | Mobile URL only | C2C only |
|---|---|---|
| [Ad] Ipod sale – ipod on sale ipodsale.com Call | [Ad] Ipod on sale – ipod on sale ipodsale.com | [Ad] Ipod sale – ipod on sale – Call |

FIG. 4C

2125898708
You will now be connected to 2125898708. Please click the link above to continue.

Google AdWords darrend@gmail.com | Help | Contact us | Sign out
Customer ID: 729-199-8899

Campaign Management | Reports | My Account
Campaign Summary  Tools  Conversion Tracking

New Campaign Set-up

Target customers > Create ad > Choose keywords > Set pricing > Review and save

Create an ad

Create ad: Text Ad | Image Ad | Mobile Text Ad

Create ads that will run when someone uses a mobile phone to search Google for your keywords. At this time, mobile ads may only target Japan.

Headline: [_____] Max 12 characters

Description: [_____] Max 12 characters

[Ad] Mars Vacations -
Cruise to Mars!
redplanettravel.com

Common Questions
- How much do mobile ads cost?
- How do I create a mobile web page?
- Where will my mobile ad appear?
- How can users connect to my business via telephone?
- What are Google's Editorial Guidelines for ads?
- AdWords Glossary

Search Help
[_____]

Select a destination for users who click your ad. You can link to a mobile web page [?], connect users to your business telephone, or both. The cost of your ads will be based on your Max CPC for the keywords in this Ad Group.

☑ Link this ad to a mobile web page [?]

Display URL: [?] [_____] Max 20 characters
What if my URL is longer than 20 characters?

Mobile Destination URL: [?] [http://_____] Max 100 characters
Your destination URL must be a web page specifically designed to fit mobile phones.
For browsers that support: ☑ xhtml ☑ wml ☑ chtml [?]

☐ Connect users to my business via telephone [?]

Business phone number: [_____] Examples: 03-1234-5678, 03-123-4567
Must be located in Japan and must not be a toll number.

Choose mobile carriers:
⦿ Show this ad to users on all mobile carriers
○ Show my ads only on specific carriers' networks. [?]
   ☑ KDDI/au    ☑ NTT DoCoMo    ☑ Vodafone Japan

[Back] [Save Ad] [Continue]

©2005 Google - AdWords Home - Editorial Guidelines - Privacy Policy - Contact Us

FIG. 6B

DISTRIBUTING MOBILE ADVERTISEMENTS

TECHNICAL FIELD

The inventions disclosed in this document relate to providing advertisements for mobile devices and similar devices, and more particularly to systems and methods for presenting users with advertisements that are particularly applicable to them.

BACKGROUND

Content delivery over the internet continues to improve every day. Computer users can receive e-mail, news, games, entertainment, music, books, and web pages-all with a simple internet connection (and with improved quality on a broadband connection). Internet users have been overblessed with content lately, however. Thankfully, improved search services such as the Google search engine have allowed users to find more information more easily. Other web-based services are also available, such as maps, shopping links, images, blogs, local search, satellite images, group discussions, hosted content, and e-mail.

More and more, these services are being made available to mobile users, who now expect to receive on their telephones or personal digital assistants services similar to the services they receive at their desks. However, the displays on mobile devices are typically small relative to PC displays, so that the services do not translate well from typical PC displays to mobile device displays. As a result, certain services must be provided in different formats, e.g.—once for the desktop and once for the palmtop.

Many of these services are provided free to users, but they cost money to provide. As a result, such services are often accompanied by advertisements that help service providers defray the cost of providing the services. Although people sometimes criticize advertisements, they undoubtedly need them. We are consumers, and advertisements (whether as commercials, print ads, or other forms of promotions) are a prime way to learn about the relevant (and relative) features of products that we may wish to buy. Advertisements are, in fact, enjoyable when they are relevant to the viewer.

Thus, advertisements have been targeted, to be more relevant, based, for example, on matches between terms associated with a user, and keywords in the advertisements. For example, various vendors of ball point pens may select the word "pen" for their on-line advertising so that their advertisements are shown to some of those attempting to search on the word "pen." Also, advertisements on a web page may be populated in a similar way, e.g., the text on a page may be analyzed to locate relevant words in the text, and then the identified text may be matched against potential key words, so that the relevant advertisements are listed on the page when a user goes to view it.

SUMMARY

This document describes systems and methods for providing advertisements directed toward mobile devices in a targeted manner. The systems and methods extend beyond simply matching search requests to keywords, and may include such factors as serving advertisements only to particular mobile telecommunications carriers, or only serving certain advertisements to particular makes or models of devices, or providing advertisements during particular time periods, such as particular times of the day or days of the week.

In one implementation described here, a method of generating relevant promotional materials for transmission to a mobile device is discussed. The method comprises receiving a query from the mobile device, identifying a plurality of advertisements associated with an advertiser-directed delivery parameter that match parameters for the mobile device, and generating a response to the query comprising search results and the plurality of advertisements. The query may include an IP address associated with a telecommunications carrier, and the advertiser-directed parameter may be the carrier identity, and may be a device-specific parameter. The advertiser-directed parameter may include a device model identifier, and may also include a device display language identifier.

In some aspects, the method may further comprise maintaining an advertisement database containing advertisements linked to landing pages, wherein the advertisements are classified according to the identity of carriers associated with each of the landing pages. In addition, the advertiser-directed parameter may be selected from a group consisting of wireless carrier, device model, device maker, and supported device display language. In addition, the advertiser-directed parameter associated with an advertisement may be manually selected by an advertiser, or may be automatically selected in response to direction from an advertiser.

In yet another implementation, a method of registering promotional materials with an internet-based content provider is discussed. The method comprises providing a user identity to the content provider, submitting to the content provider advertisement content for one or more advertisements, and identifying to the content provider a device-specific parameter to target the delivery of the advertisement content. The method may further comprise linking the advertisement to a calling number or a landing page. The device-specific parameter may be selected from a group consisting of wireless carrier, device model, device maker, and supported device display language, and the advertisement content may comprise an advertisement title, an advertisement description, and an advertisement URL.

In yet another implementation, an internet-based content delivery system is described. The system comprises an advertisement database storing a plurality of advertisements directed to mobile devices, an interface connected to a network to receive requests for web-related content from a requester device, and an advertisement filter module in communication with the interface to receive information relating to the request that indicates one or more features of the device making the request, and further in communication with the advertisement database to select advertisements for transmission to the requester device having parameters that match the one or more features of the device. The parameters may be advertiser-selected parameters.

In some aspects, the system may further comprise an ad manager module configured to accept advertising content and device-related restrictions on the delivery of advertisements from advertisers who submit the advertisements. The advertisements may each comprise an advertisement title, an advertisement description, and an advertisement URL. In addition the advertisement filter module may identify an IP address associated with the request and filter content associated with the IP address or a range within which the IP address falls. Moreover, the IP address associated with the request may be a wireless service provider IP address.

In yet another implementation, an internet-based content delivery system is disclosed. The system comprises an advertisement database storing a plurality of advertisements directed to mobile devices, an interface connected to a network to receive requests for web-related content from a requester device, and means for restricting advertisements from the advertisement database to be transmitted to the requester device.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4B shows mobile adverting results that may be displayed at the beginning and end of a list of search results.

FIG. 4C shows various exemplary formats for a mobile advertisement.

FIG. 4D shows a display generated for a click-to-call advertisement.

FIG. 6A is a display showing a screen to allow an advertisers to create an advertisement directed at mobile devices.

FIG. 6B is another display showing a screen to allow an advertisers to create an advertisement directed at mobile devices.

Like reference symbols in the various drawings indicate like elements.

DETAILED DESCRIPTION

Figure 1:
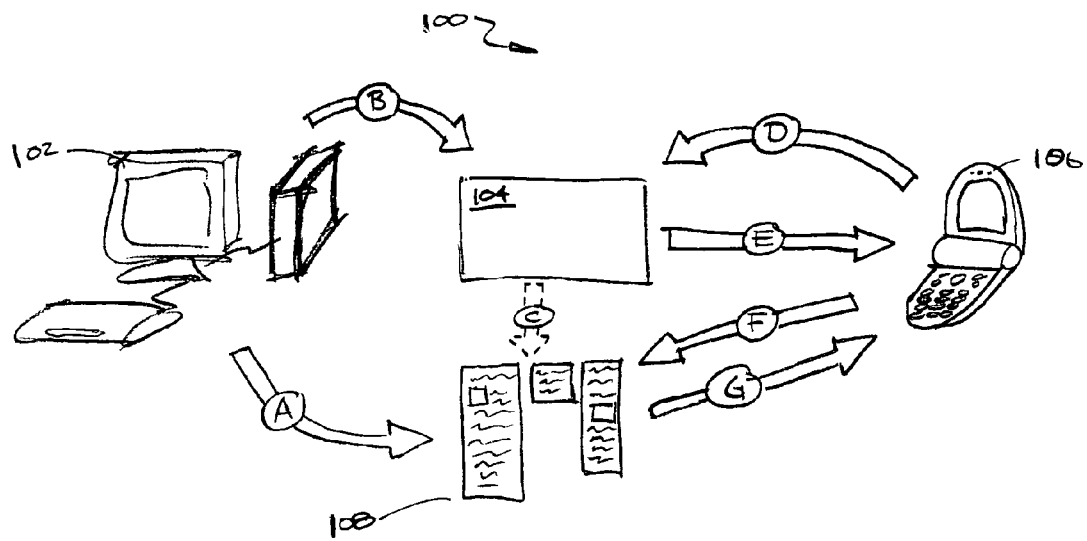
FIG. 1 is a flow diagram showing the interaction between and among an advertiser, a content delivery system, and a searching user.

FIG. 1 is a flow diagram showing the interaction between and among an advertiser 102, a content delivery system 104, and a searching user 106. In general, the figure shows an exemplary flow of messages or other information as an advertiser 102 establishes an mobile advertisement with the content delivery system 104, and the searching user 106 then views the advertisement. As used here, an advertisement includes all variety of promotional materials, including text ads, graphical ads, banner displays, animations, video and audio clips, and coupons. In the figure, the advertiser 102 selects the format of the advertisement, the target for the advertisement (e.g., a click-to-call telephone number or a web page) that is presented to the searching user 106 if the user takes some defined action (e.g., clicking a URL link) with respect to the advertisement, and certain parameters that determine the types of searching users 106 that will be presented with the advertisement.

The initial stage of the process involves the advertiser 102 creating a plurality of landing pages 108, as shown by Arrow A, and submitting one or more advertisements to the content delivery system 104, as shown by Arrow B.

The landing pages 108 may be a variety of objects, but generally would be web pages established by the advertiser or someone in cooperation with the advertiser to provide promotional information to network users. The landing pages 108 allow the advertiser 102 to provide information to users that is in addition to the information that can be provided in an advertisement. Generally, users reach the landing pages by "clicking through" an advertisement that is displayed for them by content delivery system 104. For example, a corporation like General Motors may place an ad that says "Drive the New Buick Aperture!" That sentence may be made a link for a URL or may be delivered along with a URL that links to a web site for the Buick Aperture automobile.

In this way, the advertisement can be provided in a rather unobtrusive manner by providing limited information, but a user may still obtain extensive information by clicking through. In addition, such an approach allows advertisements to be placed more easily on mobile devices, which have constrained displays. Specifically, when the display is attempting to show, e.g., search results, it can also show advertisements because the advertisements are small. If the user clicks on an advertisement, however, the entire screen can be used to deliver promotional materials to the user, such as by showing a landing page 108.

In addition, the use of click-throughs also permits for simplified tracking of user's reactions to advertisements. Specifically, when a user selects a link in an advertisement, that link may be directed toward content delivery system 104, which, when it receives an HTTP message from the clicking of the link, can log the action as a click through (e.g., to change the advertiser or the user's action with respect to the ad) and may either serve up the landing page (e.g., if the content delivery system 104 is hosting the landing page 108 or if it is acting as a transcoder or cache for the landing page 108) or redirect the user's device to the landing page.

Such landing pages may take forms other than a web page, such as a click-to-call destination. Specifically, clicking on a URL that represents a telephone number may cause a user's device to dial the related number, such as a number associated with the advertiser. For example, a pizza delivery chain may provide local advertisements in its delivery area that include its telephone number, and users may click on the number to have their mobile devices automatically dial the number for the order counter at the restaurant.

A click-to-call process may also use a web page as an intermediate landing page 108. Specifically, when a user selects an advertisement by clicking, the user may then be presented with a page containing a click-to-call link. Selection of that link may then cause the user's device to connect through a telephone call (which may involve dialing of a telephone for access through the traditional PSTN network or access to a packet-based communication, such as by provision of an IP address). Providing a click-through to a page, rather than a direct click-to-call from the advertisement, may provide for easier tracking of whether a user has responded to an advertisement, because some systems do not permit easy tracking of click-to-call activity, but do permit tracking of the delivery of pages in response to a click-through. Such a click-through click-to-call implementation is shown in FIG. 4D, discussed below.

In the step shown by Arrow A in FIG. 1, the advertiser 102 creates or identifies landing pages 108. For example, the advertiser may author web pages containing information about a product, along with order forms for the product. The landing pages 108 may be formatted to be displayed on mobile devices, such as by authoring them in xhtml, wml, chtml, html for PDAs, or iMode, among others, so as to be an appropriate result for advertisements aimed at mobile devices. The advertiser may also refer to landing pages 108 that have already been created, such as by providing a URL to such pages. The already-created pages may be formatted for display on mobile devices; alternatively, the advertiser may initiate a process that converts pre-existing non-mobile pages into pages that can be displayed accurately on mobile devices. Such a process may be manual, e.g., involving an advertiser making edits to the pre-existing pages, or automatic, e.g., by operating a web transcoder on the pages to convert elements that cannot be displayed accurately by a mobile display into elements that can.

The advertiser 102 may then register the landing pages 108 with content delivery system 104, and may provide content delivery system 104 with advertisements associated with the landing pages 108. For example, an advertiser may access an advertisement construction web page provided by content delivery system 104, and may enter a headline for an advertisement, along with a description of the advertisement and a URL for a landing page 108 associated with the advertisement. The advertiser 102 may also create the landing pages 108 with the content delivery system 104, such as while the advertiser 102 is setting up its advertisements.

In addition, the advertiser 102 may define a number of device-specific parameters that may be used to direct where or under what conditions the advertisement is or is not displayed. For example, where the advertiser 102 has authored a landing page or group of landing pages that can only be displayed by an iMode-capable telephone, the advertiser 102 may identify such mode of display with the advertisement. The content delivery system 104 may then use such a parameter to ensure that the advertisement associated with the landing page is not delivered to any non-iMode-capable device.

In a like manner, an advertiser 102 may specify one or more mobile carriers whose subscribers may see the advertisement 102. An advertiser may want to do so for multiple reasons. For example, if the advertiser is paid through a particular carrier's billing process (e.g., if the advertiser provides downloadable content such as songs, videos, games, or ringtones), the advertiser may not want to show its advertisements on devices for any other carriers because users of such devices could not take advantage of the advertised features. Also, an advertiser may be able to obtain regional selection with a particular carrier (or by using location information available from a mobile device), or may prefer the demographics of a particular carrier. For example, advertisers having sports-related products may prefer to target their advertisements at a carrier having a relationship with ESPN.

Arrow C indicates that the content delivery system 104 may host the landing pages 108, so that the advertiser 102 may create the pages off-line and then submit them to the content delivery system 104, or may create the advertisements in an electronic facility provided by content delivery system 104. Such hosting of landing pages (including initial pages pointed to by an advertisement link, and also optionally additional pages that are linked to the initial pages) may provide advantages in that the landing pages 108 may, in appropriate circumstances, be delivered more quickly to users. In addition, hosting of the landing pages may provide for better integration with the content delivery system 104, so that groups of pages may be updated more readily, including by receiving advertising content from the content delivery system 104.

With the advertisements and related landing pages 108 registered with the content delivery system 104, the activity may enter a second phase in which a searching user 106 is provided with advertisements and landing pages 108. As shown by Arrow D, the searching user 106 may submit a request for information, such as by entering a search request to a search engine like the Google search engine, or by requesting a web page (either from content delivery system 104 or from another site). The content delivery system 104 may analyze the request to respond to it with responsive content, and may simultaneously identify possible advertisements to display to the searching user 106.

The choice of advertisements may be based, for example, on the Google Adwords system, by which relevant advertisements are identified by matching terms in the search request to keywords identified by advertisers, and weighting matching advertisements by the amount an advertiser has bid (e.g., on a cost per click basis) along with the determined relevance of the advertisement to users (e.g., determined by how frequently users click on an advertisement in similar situations). In a similar manner, where the user has requested a particular web page (e.g., by clicking on a link directed at the page), the advertisement selection may use the Google Adsense system, which analyzes the content of the page to generate advertisements that bear a relation to the content of the page.

The content delivery system 104 may also filter advertisements, such as by using the parameters provided by the advertisers and by knowledge the content delivery system 104 gains about the searching user 106. For example, the content delivery system 104 may correlate an IP address received with a user request, to a database of stored IP addresses for various wireless carriers, to determine that the request has come from a subscriber to that particular carrier. The content delivery system 104 may then send only those advertisements that the advertiser 102 indicated as being directed to the subscribers of that particular carrier Similar determinations about the type of device (e.g., the model of the device or the mark up languages displayable on the device) may also be made by analyzing header information in a request, and the system may filter advertisements accordingly.

With the appropriate advertisements selected, the content delivery system 104 may then deliver the advertisements to the searching user 106, as shown by Arrow E. Such advertisement delivery may be made along with search results that correspond to the user's query, or may be part of a web page delivered to the user. As explained more fully below, the advertisements may be displayed, for example, physically above and below the search results on the screen of a mobile device.

If a searching user 106 selects one of the advertisements, their device may be redirected to one of the landing pages 108 associated with the selected advertisement, as shown by Arrow F. The initial landing page and any subsequent landing page may then be delivered to the searching user's 106 device.

In various implementations, the content delivery system 104 may be a variety of forms of service providers that present information to requesting users over a network such as the internet. Content delivery system 104 may be associated with, for example, a search engine, an e-commerce web site provider, a mapping service, a hosted storage service, a blog provider, and other such services.

By the exemplary process just described, advertiser 102 may better control the types of users or devices to which its advertisements are sent. For example, the advertiser may limit the recipients of advertisements to users that are capable of viewing the related landing pages, to users who are able to respond to advertising (e.g., through their carrier), or to users of a certain demographic. Such features may benefit the advertiser 102 in that it avoids paying for advertising directed to searching users 106 who will not or cannot respond to the advertising. The features benefit searching users 106 because they are shown more appropriately-directed advertisements that they are more likely to enjoy. And the features benefit the provider of the content delivery system 104 which is able to promise all its users better, more targeted advertisements.

Figure 2:
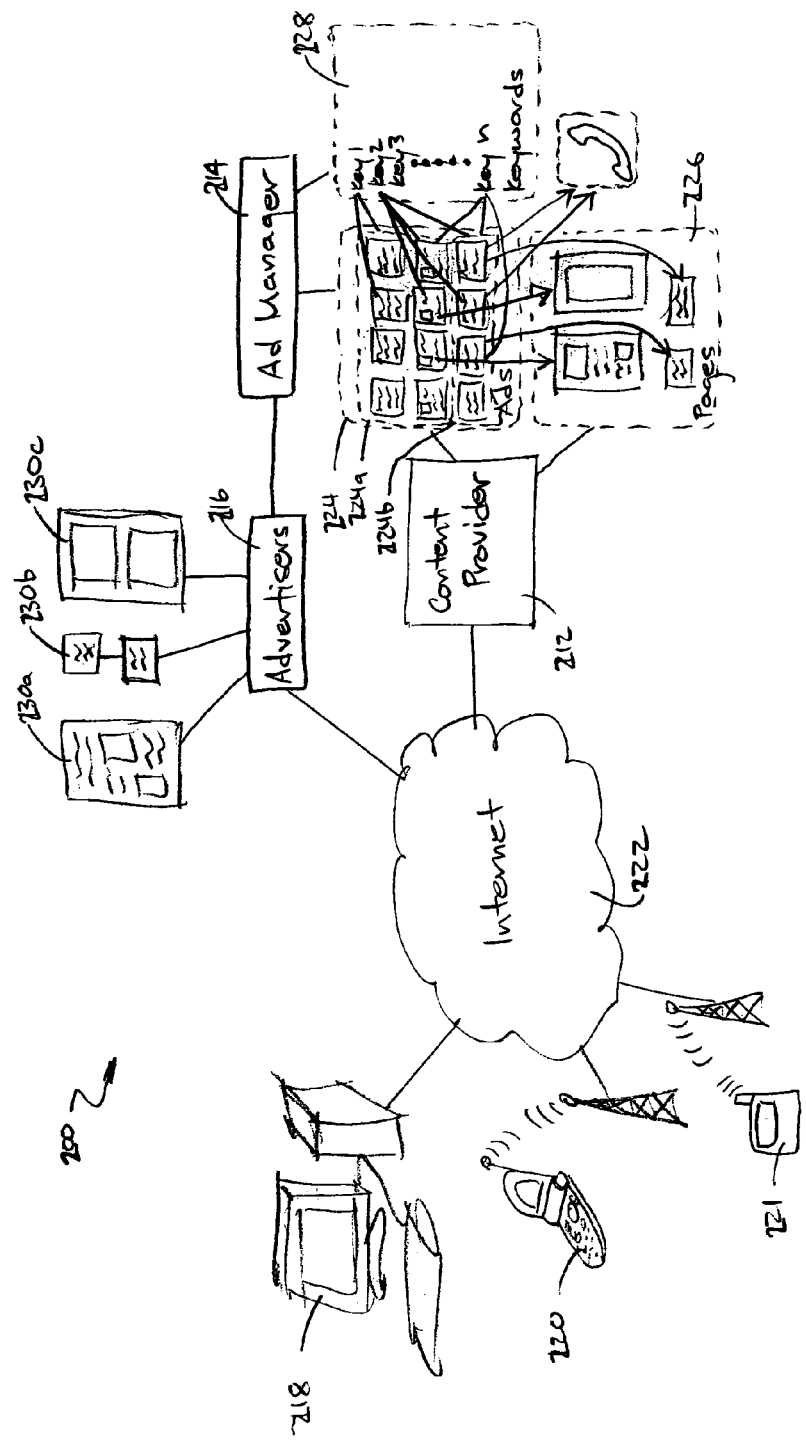
FIG. 2 is a schematic diagram of a system in which users may obtain advertising and other information for wired and wireless devices.

FIG. 2 is a schematic diagram of a system 200 in which users may obtain advertising and other information for wired and wireless devices. Again, the system 200 includes a content provider 212 receiving requests and providing responses through a network such as internet 222. The users of services provided by content provider 212 include desktop computer 218, cellular telephone 220, and personal digital assistant 221, each having access to the internet, such as through a private or other network. The types of devices are exemplary, and are intended to show that both mobile and non-mobile devices may access content provider 212, and that various types of mobile devices may access content provider 212 through different networks, such as different cellular carriers.

The content provider 212, among other things, identifies and serve advertisements 224 to the users. The advertisements 224 may include various types of advertisements, including advertisements 224a that are directed to full-featured computers such as desktop computer 218, and advertisements 224b that are directed to one or multiple groups of mobile devices.

The advertisements may be linked (as shown by downward-pointing arrows) to various forms of landing pages 226, as explained above. Advertisements 224a may be, for example, advertisements that point to landing pages 226 having rich content such as large images or Flash content. In addition, the advertisements themselves may contain such rich or complex content. Advertisements 224b may be, for example, advertisements that point to landing pages 226 that may be displayed more readily on a mobile device, such as landing pages authored in iMode, xhtml, wml, and chtml. The landing pages 226 are shown here as hosted landing pages, in that they are served to users by content provider 212.

Remote landing pages 230a, 230b, 230c may also be provided. These landing pages are not hosted by the content provider 212, but are instead provided by other service providers, such as by servers operated by the advertisers 216 themselves. The remote landing pages 230a, 230b, 230c may take various forms, limited only by the capabilities of the advertisers and those with which the advertisers are associated. For example, remote landing page 230a is a full-featured web page, which may be, for example, an on-line brochure containing text and graphics about a product, along with hyperlinks to other relevant information. Remote landing page 230a may be considered a non-mobile web page to the extent it contains content that cannot be rendered on a mobile device with sufficient accuracy.

In a like manner, remote landing page 230c may be a full-featured page made up of an interactive application such as a Flash animation. The elements of the page 230c may be too complex to be supported by a mobile browsers, and the page 230c may thus be considered to be a non-mobile web page. In contrast, landing pages 230b may be comprised primarily of text, with perhaps small images. In addition, the pages 230b may be authored in wml or xhtml to be more easily displayed on a variety of mobile devices. The advertisers 216 may want to control access to each of these types of landing pages, so that mobile users are taken to landing pages 230b, and desktop users are taken to landing pages 230a and 230c.

Advertisements 224 may also be linked to click-to-call feature 227. Feature 227 may include the delivery of a landing page having a click-to-call URL in response to the selection of a link in an advertisement, or may simply involve the provision of an advertisement containing a click-to-call link. Any particular advertisement 224 may contain either or both of links to a landing page 226 or a click-to-call feature 227.

Keywords 228 may provide a mechanism by which content provider 212 identifies which advertisements 224 to deliver to users. For example, each keyword 228 may be a word or group of words that an advertiser 216 believes to be descriptive of or linked to the product or service being advertised. For example, a provider of maps that show the voter break-down from a presidential election (red state/blue state) may produce an advertisement and associate with it keywords such as "electoral college" or "election results."

The content provider 212 may select advertisements 224 for display by matching such keywords 228 to the content of a request, such as a request from one of users 218, 220, 221. For example, if a user conducts a Google search on "presidential election results," the content provider 212 may identify the map advertisement as responsive to the request, and select it for display to the user when the content provider 212 generates search results for the user. The request may likewise come from a system that delivers web content, such as the web site of a public newspaper. In such an event, the words to be matched to advertising keywords may be certain words in a newspaper. For example, in a story about the presidential election, the terms "electoral college" or "election results" may be used, and the appearance of those terms may cause the selection of the map advertisement for display in advertisement areas of the web page for the newspaper article.

The selection of advertisements 224 to be delivered may be based on additional factors, such as when content provider 212 has more advertisements responsive to a request than it can display for a user. Advertisers may provide a bid that they are willing to pay when a user clicks on their advertisements or performs some further actions on a landing page. Higher bids may lead to higher placement in a list of advertisements delivered by the content provider 212. To prevent advertisers from "bidding up" advertisements that are not useful to users, the placement of advertisements may be moderated by the relevance to users, measured, e.g., by how often users select the advertisement when it is displayed. Such an approach may be implemented for example, as in the well-known AdWords and AdSense programs implemented by Google.

In certain situations, advertisers may want more control over their advertisement placement than is possible through keywords and bidding. With respect to mobile devices, as explained above, advertisers may wish to direct their advertisements only to certain users (or, by extension, certain devices). Several examples may provide a better understanding of such a desire by advertisers.

First, consider MaMa Mia's restaurant in San Francisco, which could use keywords such as "Italian restaurant San Francisco". Recognizing that more users are searching from their mobile devices, MaMa Mia's recognizes that its web page has content that is too rich for such users to easily find the restaurant menu and telephone number. They want to generate results for mobile users with the same keywords, but MaMa Mia's does not have the resources to design entirely new web pages, and prefers not to rewrite all its advertisements (perhaps because they simply want to test mobile advertisements to gauge their effectiveness). They may simply want to provide a click-to-call for such searches, and may also want to pay a different price for click-to-call for their mobile advertisements than they do for their ordinary desktop advertisements. They may also want to limit display of advertisements to users within a particular area near the restaurant, and may limit the timing for the advertising (e.g., around the lunch hour and the dinner hour). As a result, MaMa Mia's may use ad manager 214 to generate mobile advertisements from existing advertisements, to limit the geographic reach of its advertisements, and to limit the time during which its advertisements may be delivered.

Second, consider Ringers, a ringtone download provider that has a financial relationship with Sprint and Verizon, so that subscribers to those carriers may be billed through their cell phone bill for ringtones downloaded from Ringers. In addition, Ringers may provide polyphonic tones that are only operable on Nokia and Samsung devices. Finally, because desktop users do not generally want ringtones, Ringers may have only a WAP portal. In addition, Ringers may have no interest in a click-to-call option, because it is a virtual, computer-operated company without anyone to answer the phone or any need to answer the phone. Because users falling outside Spring and Verizon, or using telephones other than from Nokia and Samsung cannot use the ringtones, such users would likely be confused if they were led to Ringers' website, and because Ringers would get no benefit for paying for such user's click throughs, Ringers may use ad manager 214 to control to which users it advertisements are directed.

As another example, an online flower distributor that provides free shipping on over 2500 items may have an extensive AdWords campaign with dozens or hundreds of advertisements linked to numerous keywords. It wants to work with the content provider 212 to launch a mobile advertisement campaign, but its current creative—"Free shipping for all online orders same day delivery, 2500 products"—is too long for display on a mobile device, and the distributor does not have a WAP page. It wants contact with mobile users to be through its 1-800 ordering number via click-to-call, and it would like the content provider 212 to host the mobile landing pages.

Ad manager 214 provides an application and interface by which advertisers 216 may produce, post, and manage advertisements and advertising campaigns—such as in response to the scenarios just discussed. Although shown for clarity as a system separate from content provider 212 that connects directly to advertisers 216, the ad manager 214 may be a part of content provider 212 and may generally communicate with advertisers through an intervening network such as the internet 222. As explained in more detail below, the ad manager 214 may interact with advertisers 216 to allow them to establish advertisements to be directed to mobile devices, to set delivery parameters for such advertisements, and to manage advertisements and groups of advertisements (e.g., as parts of campaigns).

Figure 3:
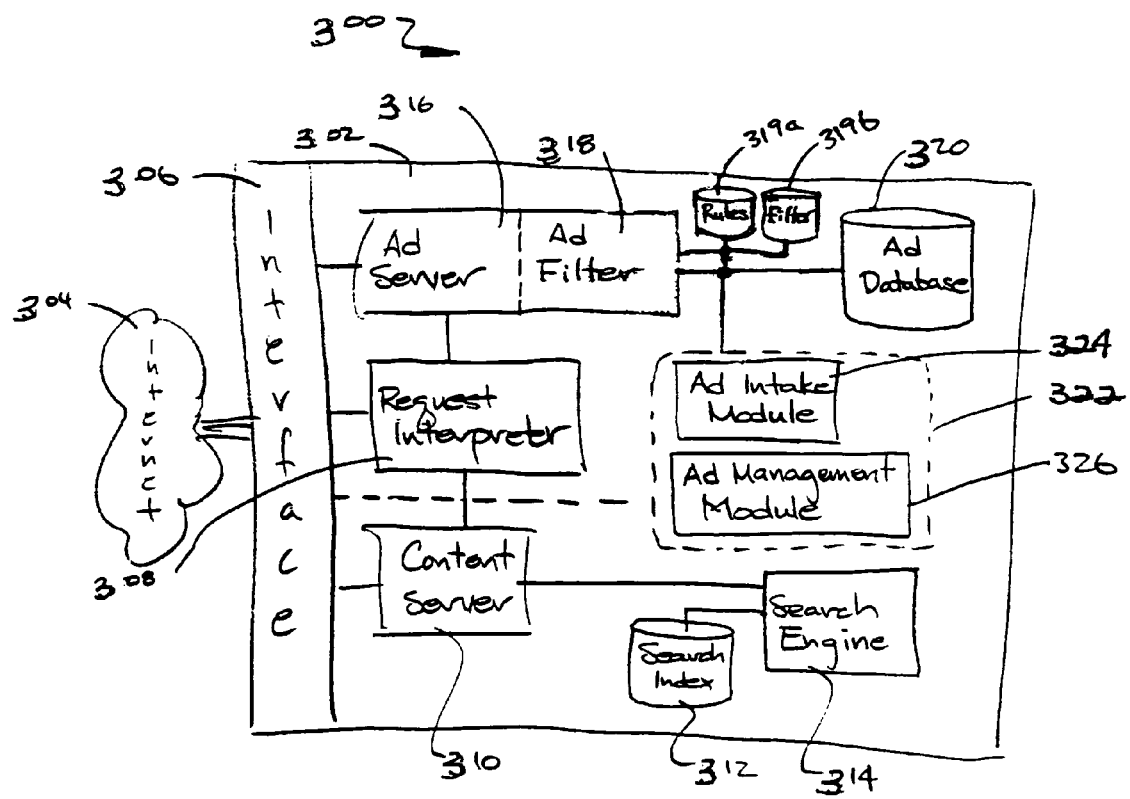
FIG. 3 is a schematic diagram of a system for providing relevant advertising.

FIG. 3 is a schematic diagram of a system 300 for providing relevant advertising. The system may be a system like that operated by content provider 212 in FIG. 2. The system 300 communicates through interface 306 with a network or networks, including internet 304. Interface 306 may include, for example, a web server or group of web servers organized in a conventional manner. Although the system 300 is shown schematically in a single box, it may be implemented in a variety of manners, including by using a variety of specialized servers, including servers that accept portions of a process to permit for easy large-scale application of the system 300. The particular architecture of the system is not critical.

System 300 is configured to receive requests and to respond by supplying various forms of data, such as search results, along with promotional content in the form of advertisements. Requests may be received, parsed, and interpreted by a request interpreter 308. The request interpreter may, for example, determine the form of the request, such as whether it is a search request, a local search request, a mapping request, or another form of request. Such actions may occur apart from interface 306, as shown, or as part of interface 306.

Among other things, request interpreter 308 may forward appropriate information from the request (either in its raw form or in an interpreted form) to ad server 316 and content server 310 (each of which may include a number of servers). The forwarded information may include the search terms themselves (where the request is in the form of a search request) along with metadata from the request, such as header information that may indicate from where the request is being made. For example, information may be transmitted with a request that includes an IP address for the requester or for a wireless carrier with which the requester is a subscriber. Also, information may be provided that indicates a location of the requester, a maker of, and/or model of the device used by the requester, and the types of mark-up languages supported by the device.

On the content server 310 side, the request information may be forwarded to a search engine 314, which may be any appropriate form of search engine such as the Google search engine. The search engine 314 may rely on a search index 312, which may comprise a reduced-in-size representation of the content on all of the web pages and other documents to which the search engine is directed. The search engine may identify documents containing the search terms, and may rank the matching results, such as by analyzing the linkages between documents to identify the documents that are most linked-to, and thus likely to be the most relevant documents. The search engine 314 may return its located search results to the content server 310, which may then assemble the results, provide the ranking, or otherwise prepare them for transmission. The content server 310 may then pass the results to the interface 306.

On the ad server 316 side, the search terms and other information may be forwarded from the request interpreter 308 to the ad server 316. The ad server may search in an ad database 320 for advertisements linked to keywords that match keywords in the request. In addition, the ad server may be provided with an ad filter 318, which may apply advertiser-specific rules to the advertisements, to filter out certain advertisements before they can be transmitted back to a user. For example, where metadata forwarded by the request interpreter indicates that a request was from a particular wireless service provider, the filter may exclude advertisements that were not selected by advertisers to be provided to such a carrier.

Ad filter 318 may access rules database 319a and filter database 319b in determining which advertisements should be returned in response to a request. Rules database 319a may include advertiser-specific and more general rules that control which advertisements may be returned to particular types of requests. For example, rules in rules database 319a may define that certain advertisements may not be sent to certain models of mobile device, or to users subscribed with certain carriers, as indicated above and below.

Filter database 319b may include other data needed by ad filter 318. For example, wireless carriers may reserve IP addresses in blocks, so that each carrier may be associated with a range or ranges of IP addresses. Such information may be stored in filter database 319b, so that a look-up may be performed on incoming IP addresses to determine the carrier associated with a user, so as to permit filtering of advertisements by advertisers' carrier preferences.

Ad manager 322 may permit system 300 to accept advertisements and allow advertisers to manage their advertisements and advertising campaigns. For example, ad manager 322 may communicate with advertisers and provide them with a workflow for creating and/or submitting advertisements, and with managing the advertisements, such as for setting device-specific rules for filtering advertisements, and for managing bids and keywords associated with advertisements, as discussed more fully below.

Ad manager 324 may include ad intake module 324, which may provide an interface for advertisers to submit advertisements. The intake module 324 may receive, for example, text for an advertisement and a URL to which the advertisement points, a click-to-call number associated with the advertisement, the mark-up languages for which information associated with the advertisement, such as a landing page, is authored (e.g., if the advertisement is meant to be a mobile advertisement), and the locations and/or times at which the advertisement is to be shown.

Ad manager 324 may also include an ad management module 326, which may interface with advertisers to allow them to modify their advertisements, to manage how their advertisements are presented, and to manage more complex advertising campaigns. The ad intake module 324 and ad management module 326 are shown for clarity as two separate modules in the ad manager 322, but they could be combined with each other and/or operated with other modules and features, as is appropriate to provide advertisers with complete advertising services.

Figure 4A:
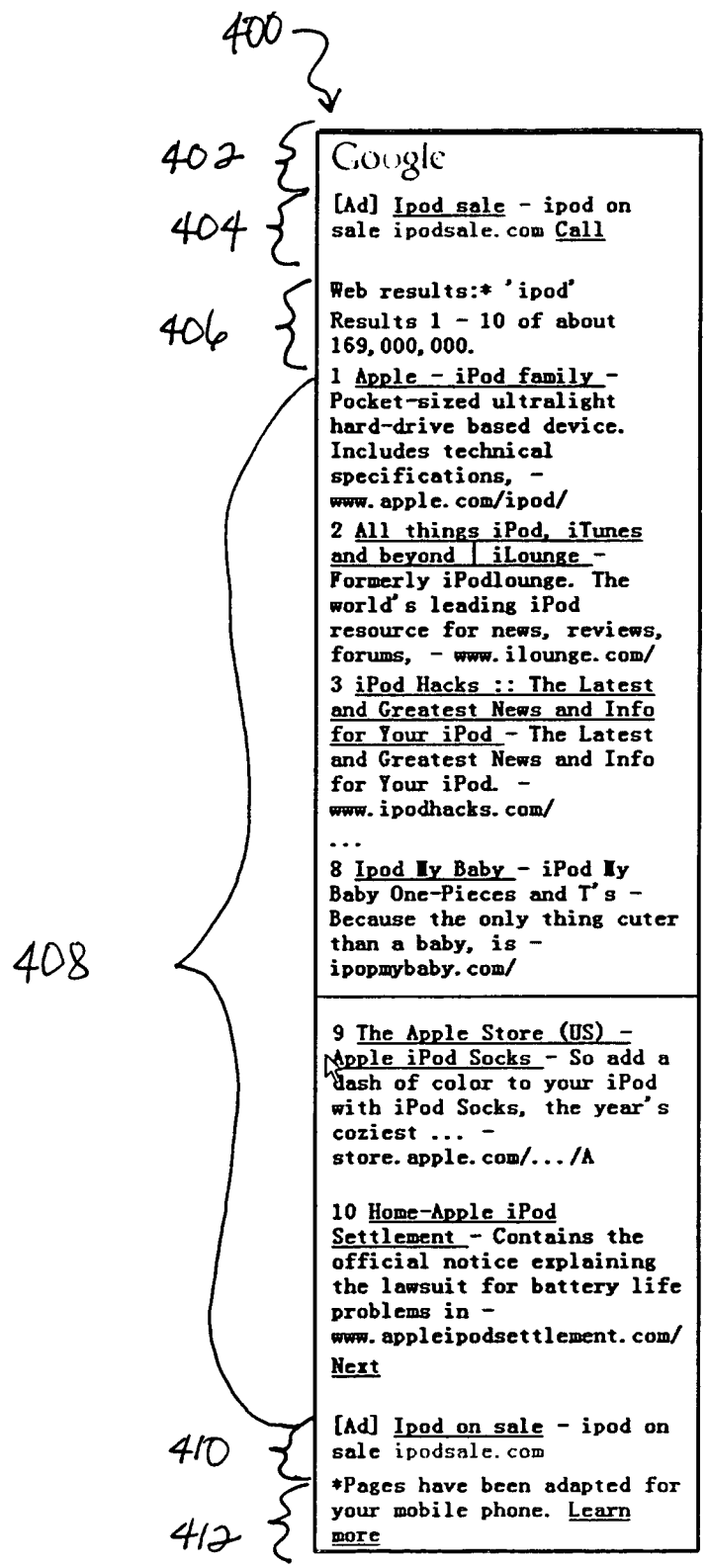
FIG. 4A is a display of mobile search results.

FIG. 4A is a display 400 of mobile search results. The search results are displayed as core search results 406 along with advertising results 404, 410, and other information. Typically, the display 400 would be generated after a user of the device that makes the display 400 has conducted a web search or other similar search (e.g., blog search, local search, or shopping search). A mobile device would be expected to have a display that could only show a minor portion of the total results at one time. Viewing of the entire display 400 would require scrolling or other navigation by the user, depending on the size and resolution of the user's screen. The entire display 400 is shown here for clarity.

As shown, a logo 402 is presented at the top of the display 400 in a reduced size so as to indicate the source of the results to the user. The logo is followed by advertisement 404. Because of the expected small size of a screen on a mobile device, the advertisement 404 is relatively short, and only one advertisement is shown. Specifically, in the figure, the advertisement 404 title is "ipod sale" and the advertisement text is "ipod on sale." The advertisement 404 also shows a URL—"ipodsale.com"—to which a user may navigate (e.g., with a scroll wheel, direction pad, or touch screen) and click, to be taken to that web site (as a landing page). The advertisement 404 title may also act as a URL on which a user may click.

The content of the advertisement 404 may be explicitly-selected by a user when establishing the advertisement as a mobile advertisement. Alternatively, the content may be converted from a non-mobile advertisement that had a longer title and/or description (snippet) and/or URL. The content may also be a truncated form of content, which has been cut off so that it will fit on a mobile device.

The advertisement 404 is also called out by an "[ad]" tag so that the user knows that the advertisement 404 is paid content, and not search results. Such labeling is analogous to standard desktop advertisement presentation for Google, which shows advertisements separated from the search results so that user will not confuse the two.

In addition, the advertisement 404 includes a click-to-call selection, which is a URL labeled "Call." Selection by the user of this URL may result in the user's device dialing the telephone number or IP address of the advertiser or an entity related to the advertiser (e.g., a customer service contract firm). Alternatively, the "Call" URL may retrieve a click-to-call page for the user, whereby further selection of a click-to-call URL on that page causes a number to be dialed. This later approach may make tracking of whether the user has responded to the advertisement easier, and thus to make billing to the advertiser more accurate.

Another advertisement 410 is provided at the bottom of display 400. In the example, the advertisement 410 is for the same advertiser and is in the same format as the first advertisement 404, except that the latter advertisement 410 does not include a click-to-call link. Of course, other relevant advertisements for other advertisers may also be displayed, and a central system may be programmed so that two advertisements for the same advertiser or the same campaign are not displayed in response to a single query.

Advertisement format and placement can have an appreciable affect on the click-through rate. Placing advertisements near the top of display 400 places them in a prominent location for the user, and may initially increase click-through rates. However, such placement also blocks out the search results 408 so that a user may have to navigate simply to see any appreciable part of the search results. Thus, such placement can be a negative in the long run. Also, the format of each advertisement likewise can block more of a display in order to convey more information. The displayed advertisement format (e.g., Header(link)+description+URL") is a relatively detailed format but also may provide high click-through rates because of the amount and form of the information conveyed.

Similarly, although two advertisements at the top of display 400 provides for high click-through rates, it may unnecessarily interfere with the user's access to search results 408. As a result, the display 400 is shown having one advertisement 404 at the top and another advertisement 410 at the bottom. Note that, in expressing that the advertisements 404, 410 are at the top or bottom, they are not necessarily at the very top/bottom of display 400, but are instead near the top/bottom and/or at or near the top/bottom of the search results 408.

The length of the advertisements 404, 410 may also be defined so as to provide a pleasant and useful display 400. For example, Japanese devices (e.g., cellphones) have a width of around 15 Japanese characters on average, while U.S. and European devices have an average width around twenty-six characters. To keep advertisements to three lines, advertisers may be limited in characters to a Japanese format of "Header (12)+Description(12)+URL(20)" and a Western language format of "Header(15)+Description(15)+URL(20)." The length limit may likewise depend on target language. If an advertising campaign is to be run in multiple languages, a limit may be set to the minimum for all languages or advertisements may be truncated in the longer languages. A system may allow a user to identify the language so that the system may respond with appropriate character limits.

The search results 408 in display 400 may be formatted and displayed in various appropriate manners. As shown, the search results are displayed as a hyperlinked title, a snippet, and a URL. The title may be extracted from a Title tag for a web page or from other appropriate information. Where the title exceeds a permissible length, it may be truncated or otherwise abbreviated. The URL may be the URL for the web page or other document represented by the research result, and again may be truncated or otherwise abbreviated if it exceeds a pre-determined length (or if the total displayed text exceeds a predetermined length). For example, search result nine in the figure shows ellipses replacing the middle portion of a path for a URL. The snippet may be language surrounding terms that match a search term provided by the user, or may be other content (including text or graphics, such as an image search result) from the target document. The snippet may be determined in any appropriate manner.

Instructions 412 are provided at the bottom of display 412. Instructions 412 may take a variety of forms, but in the figure they appear as a notice that the pages delivered on the display 400 are adapted to fit a mobile phone. For example, the content provider that responds to a search may include a transcoder that reformats web pages to display properly on a mobile device, such as by reducing the size of figures and collapsing menus into expandable lists. A "Learn more" hyperlink is provided so that a user can better understand how the transcoding occurs. Other instructions and/or links may also be provided, such as copyright notices, links to legal pages, links to help pages, and the like.

FIG. 4B shows mobile adverting results that may be displayed at the beginning and end of a list of search results. The display is similar to that in FIG. 4A, but better approximates what would show up initially to a user in response to a search request (e.g., for "ipods") in the left, and what would appear after a user has scrolled to the bottom of a search result page.

FIG. 4C shows various exemplary formats for a mobile advertisement. The leftmost format includes a mobile URL and a click-to-call hyperlink. In this example, a user may select the mobile URL to have a landing page displayed (e.g., by redirecting the user's browser, or by supplying the page from the content provider, such as by a transcoding process). The user may select the click-to-call link either to institute a call immediately, or to receive a click-to-call page from which the user may instigate a call. The middle advertisement shows only a mobile URL choice, while the rightmost advertisement shows only a click-to-call choice. Advertisers may be allowed to select which elements of an advertisement are to be displayed, when they initially post an advertisement, or as they manage their advertisement or advertisements.

FIG. 4D shows a display generated for a click-to-call advertisement. This is an example of a landing page that may be generated when a user selects a "Call" link, as described above. The actual number (e.g., phone number or IP address) to call may be displayed, and the user may then select that number to initiate a call. Providing an intermediate page in this manner helps track the response to the advertisement, as discussed above, and also helps prevent a user from making a call accidentally.

Figure 5A:
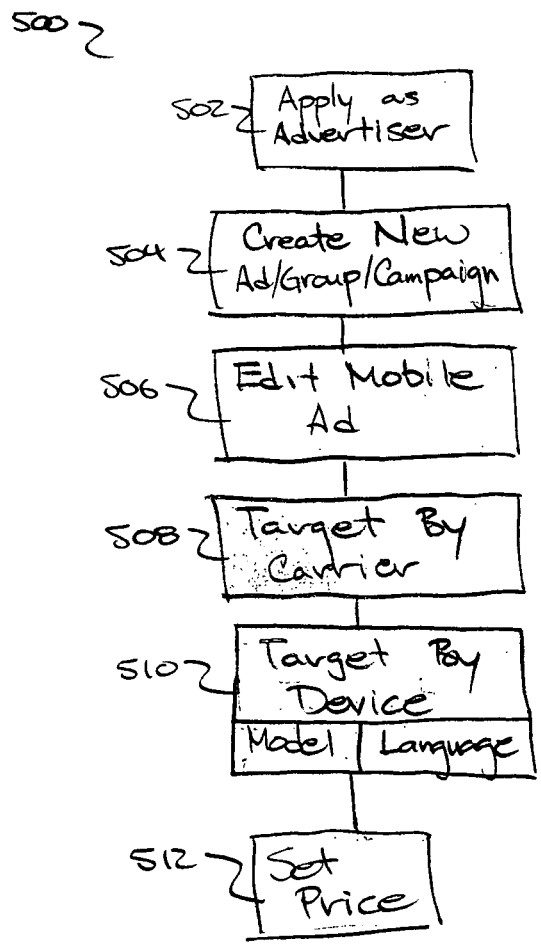
FIG. 5A is a flowchart showing actions involved in registering advertisements for mobile devices.

FIG. 5A is a flowchart 500 showing actions involved in registering advertisements for mobile devices. These action may be carried out by an advertiser communicating with an ad manager. At act 502, a user initially applies to be an advertiser. Such a sign-up process is relatively standard, and may involve the user providing contact information and information about an account from which advertising expenditures may be obtained, along with selecting a user ID and password. Such an application process may occur once for an advertiser, and thereafter the advertiser may simply log into the system using the pre-identified user ID and password.

At act 504, the user may create a new advertisement, ad group, or ad campaign. An advertisement may include one or more of an ad title, ad description, URL, and click-to-call link. At the time the user creates the advertisement or at a later time, the user may also edit the advertisement 506. The system may treat the advertisement as a mobile advertisement if the user accesses the system through a gateway for creating mobile advertisements, or if the user indicates (such as by checking a box in a GUI) that the advertisement is intended for mobile devices.

Where the advertisement is indicated to be a mobile advertisement, the user may select several device-specific parameters for the advertisement. For example, at act 508, the user may target the advertisement by carrier, such as by identifying one or more wireless carriers (or even wired carriers, including VoIP providers that provide services to wireless devices) whose subscribers may receive the advertisement. The user may also target the advertisement for certain device capabilities, such as the mark-up languages or other languages or features supported by the device, or by a device maker and/or model identifier. These selections may be stored by a content provider, and may be used by an ad filter when determining which advertisements to return to a request from a particular device, as described above. For example, where a request includes an IP address that falls in a block assigned to Verizon, and another piece of metadata (e.g., that is part of the request or part of a profile that the system has built up for a particular device) indicates that the user has a Motorola phone, the system may filter out advertisements that do not have Verizon and Motorola selected.

The user/advertiser may then select a price that they are willing to pay if a searching user clicks on their advertisement or otherwise responds to it in a discernable manner, as shown by act 512.

The advertisements may be placed in a variety of manners. For example, the advertisements may be placed as part of an AdWords placement with search results (whether desktop or mobile). Also, advertisements may be placed with a partner's search results as part of a syndication arrangement or in a web publisher's web pages (whether desktop or mobile). In addition, the advertisements may be placed on transcoded web pages from syndication partner search result pages, and transcoded web pages from web publishers (again, desktop or mobile).

Figure 5B:
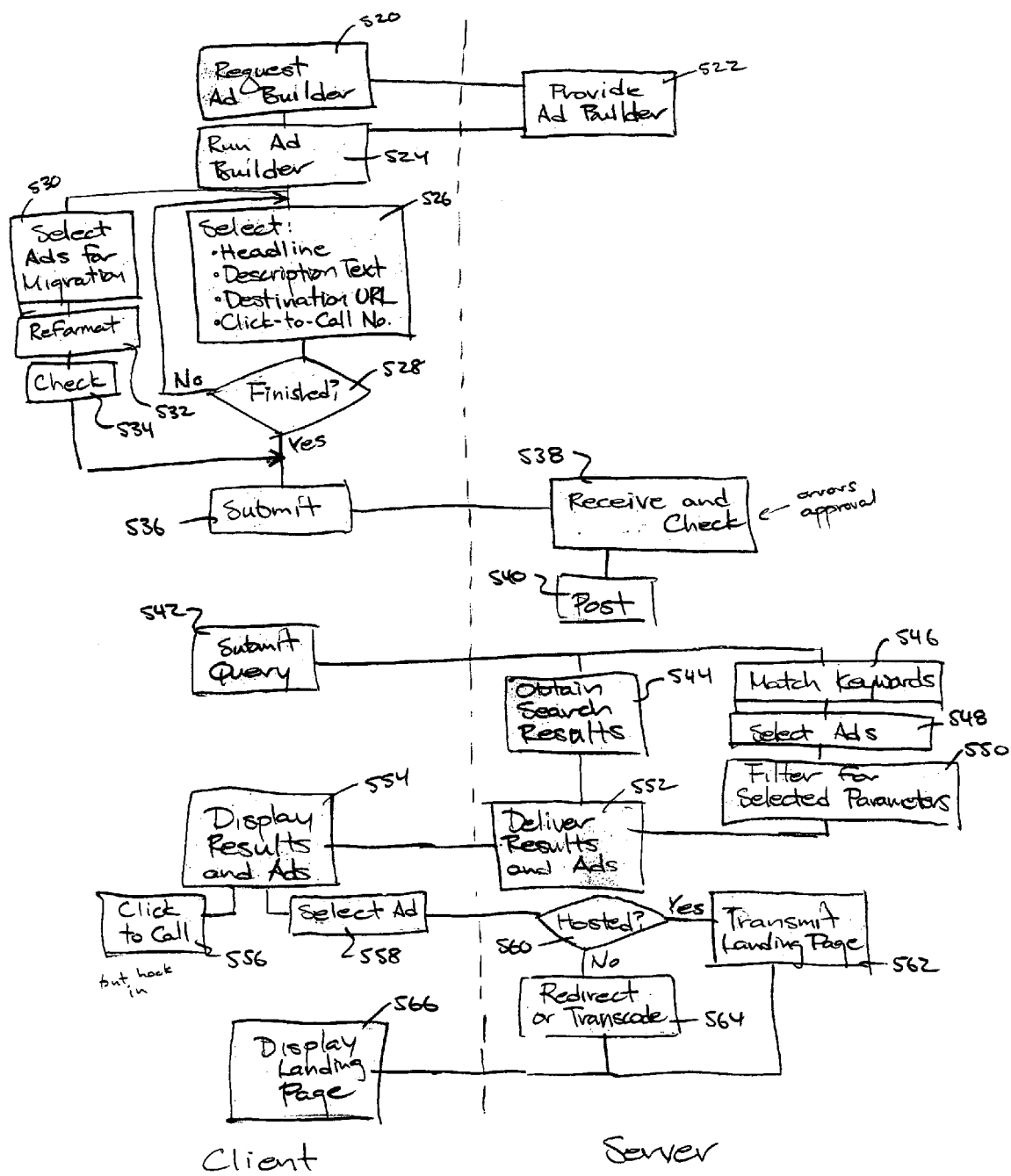
FIG. 5B is a flowchart showing actions for establishing mobile advertisements in a bulk mode, and for delivering results in response to a query from a mobile device.

FIG. 5B is a flowchart showing actions for establishing mobile advertisements in a bulk mode, and for delivering results in response to a query from a mobile device. This chart is shown as a swimlane diagram, so as to better show the interaction of actions that may be taken by a client and those that may be taken by a server. Again, the actions are exemplary, and actions may be removed, combined, or separated, and other actions may be added to the flow. In addition, the labels of client and server are not meant to require a specific architecture, but are instead directed, respectively, to a device or system that is requesting information, and a device or system that is supplying the information.

At action 520, a client makes a request for an ad builder application, and at action 522, a server responds to the request. The application may be provided as an interactive application, or may be an application that is downloaded to the client and run on the client (perhaps with access to the server as necessary to obtain information for the application). The client may then run the ad builder (action 524).

The client may provide advertisements to the ad builder in a variety of manners. In one exemplary process involving iterative building of advertisements, the process may use a form that is repeatedly presented to an advertiser until the advertiser has submitted all desired advertising information, or may occur in a single form that presents multiple advertisements at once (such as in a spreadsheet format with ad text, description, URL, and other features shown as columns in a grid) (actions 526, 528). Under either approach, advertisement content may be copied from one form to the next or one field to the next as an advertiser works to define a number of advertisements. For example, if a user enters WML as a format for an initial advertisement, and Verizon as a carrier, those selections may be repeated for all subsequent advertisements, and may be maintained unless and until the advertiser changes them.

In another exemplary approach, an advertiser may already have created a number of non-mobile advertisements, and may be given the opportunity to migrate those advertisements to a mobile format. Initially, an advertiser may indicate to the process which advertisements should be migrated or copied for transition into a mobile form. The selection may involve selecting a list of advertisements, or a preformed group of advertisements such as those in an ad campaign (action 530).

At action 532, the advertiser may be given an opportunity to reformat one or more of the advertisements. For example, a system may initially attempt to change a non-mobile advertisement into a mobile advertisement, such as by truncating text in the advertisement and identifying the format of landing pages associated with the advertisement (e.g., to determine whether the page can be rendered with an xhtml or wml browser). The system may then present the pro form a advertisements, such as in a grid, with information provided as the system can determine it. The advertiser may then be given the opportunity to reformat any advertisement further (e.g., manually) and to check the format of all the advertisements (action 534). For example, the advertiser may look at the entries for the advertisements in a grid, or may be presented with each advertisement in turn, in the format they would take when presented to a searching user. Also, the advertiser may add certain device-specific limitations on the display of the converted advertisement, such as display to subscribers of only certain wireless carriers.

When the advertisements are complete, the advertiser may submit them (action 536) back to the server, or otherwise check them in. The server (such as a content provider) may then receive the formatted or re-formatted advertisements, and may also check them for various format requirements. For example, the server may conduct error checking or other checks in the format of the advertisements. Finally, the server may make the advertisements available to searching users, such as by posting them (action 540).

In a second phase, which may occur independently of and apart from the first phase just described, a searching user at a client device (such as a wireless telephone) may submit a query (action 542) to a server (which may be the same as or different from the server involved in the first phase, and may involve a number of cooperating server machines). The server may split the request into two processes-one that obtains results for the user request, and one that delivers responsive advertisements to the user request. On the result side, the server may simply obtain relevant search results (action 544) in an ordinary manner.

On the advertisement side, the server may first match keywords from the request with keywords identified by advertisers (action 546). The server may then select advertisements (action 548) that are responsive to the search, such as those that match the keywords, and have a sufficiently high bid and relevance combined score. The server may also filter advertisements for parameters selected by or for the advertiser (action 550), such as for device manufacturers, types, or models; carrier identity; or mark-up language. With the advertisements selected and filtered and the results obtained, the server may then transmit the results and the advertisements (action 552) back to the client.

The client device may then display the results and advertisements to the user (action 554) and wait for the user to provide a response. For example, the user may scroll through the results and select a result, at which point, the server may deliver the content at the selected URL to the user, or may redirect the client to the relevant URL (not shown).

The user may instead select a feature of an advertisement, such as an advertisement landing page URL (action 558) or click-to-call link (action 556). The click to call may lead back to the server (not shown), as indicated above, such as to deliver a page having a direct click-to-call number, or to complete an IP call. Alternatively, the click-to-call link may itself be a direct link as appropriate.

Where the user selects an advertisement to proceed to a landing page (action 558), the request, such as in the form of an HTTP request, may be transmitted to the server, and the server may provide the landing page to the user. If the landing page is hosted by the server (action 560), it may be delivered directly to the client (action 562). If the landing page is not hosted (and is not transcoded), the server may send a message to the client redirecting the client (action 564) to the appropriate page or document, and the client may display the landing page (action 566).

Figure 6A:
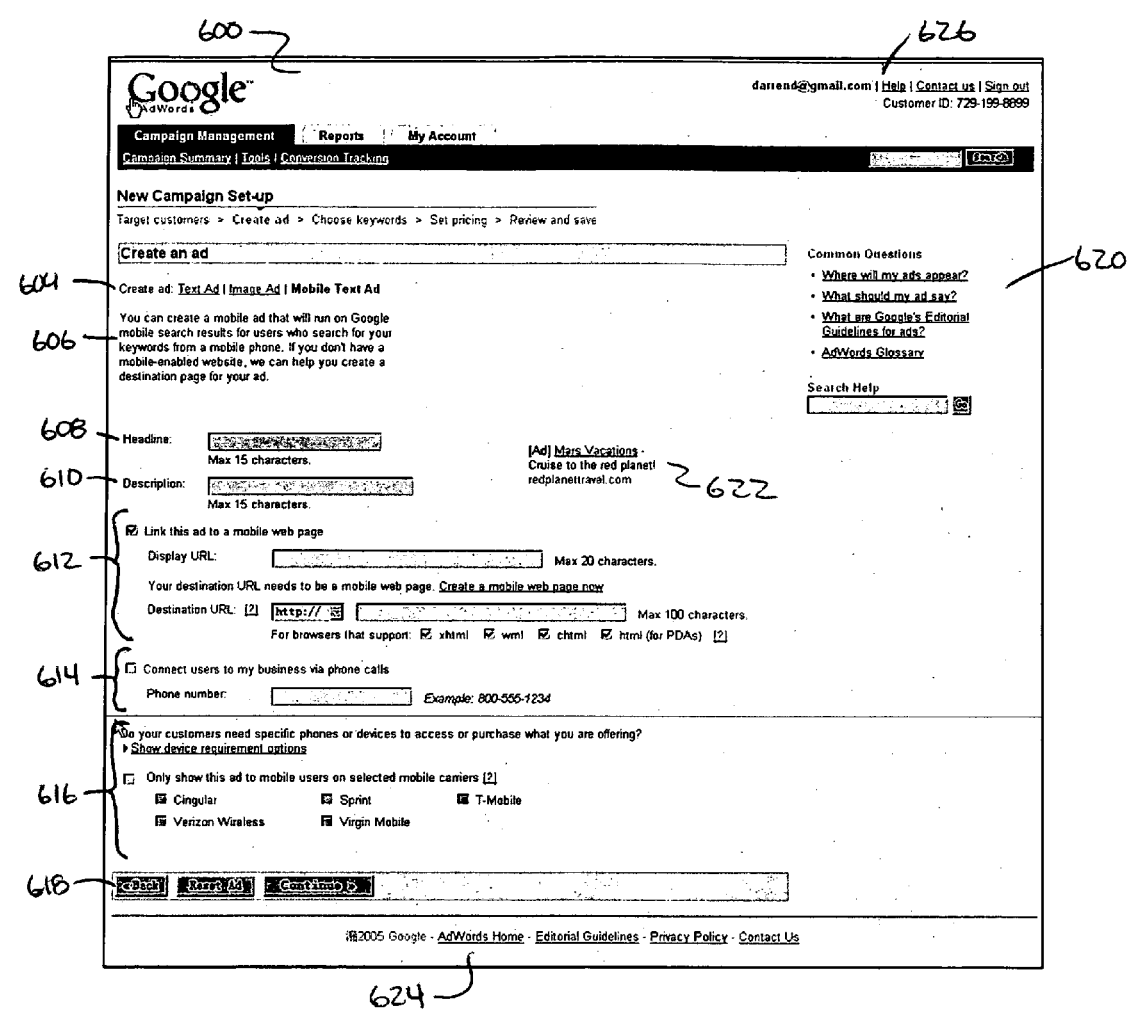

FIG. 6a is a display 600 showing a screen to allow an advertiser to create an advertisement directed at mobile devices. The screen shows the set-up options for establishing a new advertising campaign with mobile text advertisements. As indicated by the URL labels next to the "create ad" text 604, the user may alternatively create text advertisements or image advertisements for non-mobile devices. The display provides instructions 606 to a user trying to set up an advertisement, and also provides links 620 to more extensive instructions, along with a help box a user may search.

The user is invited to complete a number of fields for an advertisement. For example, the user may provide a headline 608 for the advertisement, which may be the first text displayed when the advertisement is displayed (e.g., "Ipod sale" in FIG. 4A above). The user may similarly provide a description 610, which may follow the title when the advertisement is displayed. The display 600 reminds the user of the maximum allowed length for each field; if the user exceeds the length, the displayed text may be truncated, or the user may not be permitted to enter characters after reaching the maximum length.

Area 612 allows the user to choose to link the advertisement to a landing page—preferably a mobile page. The user may select the URL to display to a user, and may also select the actual URL to which a link will point. The former URL may need to be shorter to be displayed properly on a mobile device. In addition, a link is provided for the user to create a mobile web page if they do not already have such a page available as a landing page. Clicking the link may result in the user being provider with mark-up language authoring tools for mobile display, such as WML or xhtml mark-up. The advertiser may then be given the opportunity to have the page hosted, or may transfer the page, for later display elsewhere.

Several check boxes provide the advertiser with an opportunity to identify the browsers to which the advertisement (and by extension, the landing page) may be directed. A "?" selection may provide the user with hints to determine which browsers having certain mark-up language capability and may display the landing page. In addition, the user may access features to determine whether the page can be accurately displayed by each sort of browser. For example, the system may simulate each sort of browser to generate a page, and then compare the generated page with a page generated on a full-featured browser (e.g., having a similar resolution to the expected mobile browser). The process may also be partly automated, in that the system may generate the landing page for such a simulated browser, show it to a user, and the user may indicate whether the generated display is accurate or accurate enough. The simulation may also take into account, in appropriate circumstances, the features of any device manufacturers or models selected by the users (not shown).

A click-to-call selection area 614 may allow a prospective advertiser to choose whether to provide a click-to-call option in an advertisement, and also allow the user to identify the number (e.g., telephone number or IP address) for the call.

Area 616 allows a prospective advertiser to limit the display of an advertisement to particular types (e.g., manufacturers or models) of devices, or particular carriers. Again, the user may select a box to indicate whether the user chooses this option, and may then select boxes next to one or more identified wireless carriers.

Other remaining areas of display 600 provide a user with more general information 624, with summary account information such as account name and number 626, along with options for obtaining help and signing out of the system, and with an example of how an advertisement entered by an advertiser will look when displayed to a searching user 622. The pictured arrangement for display 600 is exemplary only, and other arrangements may also be used as appropriate.

FIG. 6B is a another display 630 showing a screen to allow an advertisers to create an advertisement directed at mobile devices. This display is similar to the display 600 in FIG. 6A, and provides the same or similar features to a prospective advertiser, but is arranged in a slightly different manner.

Figure 7:
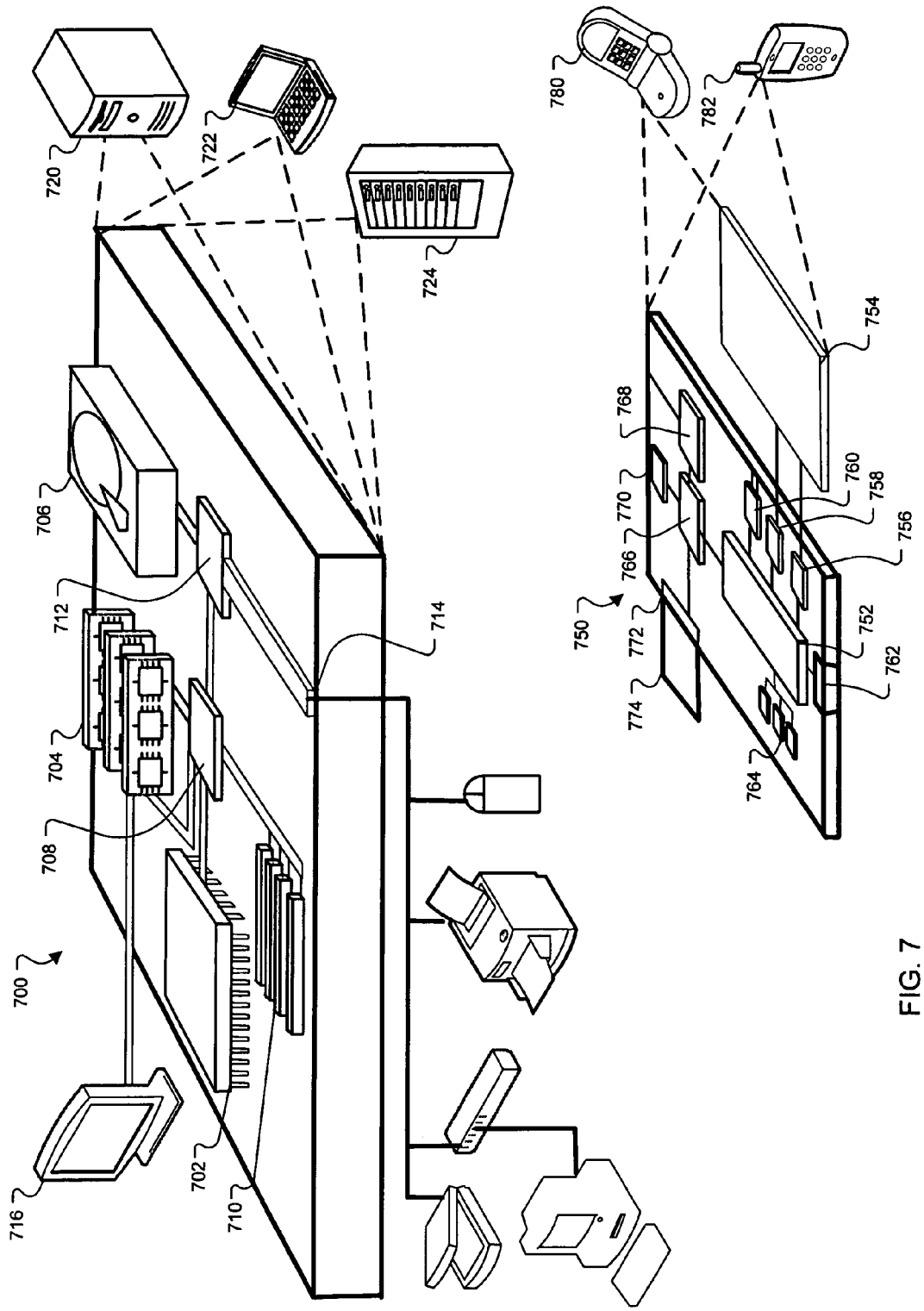
FIG. 7 is a block diagram of computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network. The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, although certain process flows and displays have been shown, the particular components of each flow and display may be rearranged as appropriate, and additional components may be added, or components may be combined, separated, or eliminated, as appropriate. Also, although much of the disclosure speaks to mobile devices and documents formatted for display on mobile devices, in appropriate circumstances, the features described here may be applied to non-mobile devices also. Accordingly, other embodiments are within the scope of the following claims.

What is claimed is:

1. A computer-implemented method of registering promotional materials with an Internet-based content provider, comprising:
generating, by one or more processing devices, one or more advertisements, the one or more advertisements being for distribution to one or more users, each user associated with one or more devices, wherein generating comprises:
identifying, by one or more processing devices, advertisement content for the one or more advertisements;
generating a creative for each of the one or more advertisements based on the identified advertisement content; and
designating, by the one or more processing devices, the one or more advertisements for use on a mobile platform or a non-mobile platform;
receiving, by the one or more processing devices, a request for content from a user of the one or more devices;
determining, by the one or more processing devices, device-specific parameters for a device associated with the request, wherein the device specific parameters are indicative of the device being configured to properly display the advertisement content and comprise a parameter that specifies a platform associated with the device and a parameter that identifies types of mark-up languages supported by the device;
reformatting, by the one or more processing devices, one or more of the one or more advertisements so that the one or more advertisements can be used on a different platform, the different platform being the platform associated with the device, wherein reformatting includes truncating text included in a given advertisement and receiving one or more additional advertiser constraints related to presentation of the given advertisement to a subset of the devices associated with the different platform;
determining, by the one or more processing devices, based on the device specific parameters, the request and the additional advertiser constraints, one or more of the one or more advertisements for presentation to the device; and
providing, by the one or more processing devices, the determined one or more advertisements for presentation to the device.

2. The method of claim 1, further comprising linking an advertisement landing page that includes a click-to-call selection that causes a telephone number associated with a respective one of the one or more advertisements to be dialed.

3. The method of claim 1, wherein the device-specific parameters further comprise another parameter selected from a group consisting of wireless carrier, device model, and device maker.

4. The method of claim 1, further comprising:
receiving, by the one or more processing devices, a calling number or a landing page, the calling number or the landing page being associated with the advertisement content for the one or more advertisements.

5. The method of claim 1, wherein identifying the advertisement content for one or more advertisements further comprises:
receiving a URL for a page not formatted for display on mobile devices; and
receiving a request to initiate a process to convert the page not formatted for display on mobile devices into a page formatted for display on mobile devices.

6. The method of claim 1, further comprising receiving, by the one or more processing devices, a bid associated with the advertisement.

7. The method of claim 1, further comprising receiving, by the one or more processing devices, a first bid that includes a first bid amount associated with display of the advertisement on a non-mobile device and a second bid that includes a second bid amount associated with display of the advertisement on a mobile device, the second bid amount being different from the first bid amount.

8. The method of claim 1, further comprising:
identifying, by the one or more processing devices, one or more target languages for the advertisement; and
receiving, from the one or more processing devices, a character limit equal to a minimum character limit of the character limits associated with the target languages.

9. The method of claim 1, wherein identifying the advertisement content for one or more advertisements further comprises:
receiving, by the one or more processing devices, a selection of one or more advertisements that include advertisement text not formatted for display on mobile devices;
receiving, from the one or more processing devices, truncated text of the advertisement formatted for display on mobile devices; and
receiving, by the one or more processing devices, re-formatted versions of the advertisements that include one or more modifications to the truncated text.

10. A computer-implemented method of registering promotional materials with an Internet-based content provider, comprising:
generating, by one or more processing devices, one or more advertisements, the one or more advertisements being for distribution to one or more users, wherein generating comprises:
identifying, by the one or more processing devices, advertisement content for the one or more advertisements;
generating, by the one or more processing devices, a creative for each of the one or more advertisements based on the identified advertisement content, using a data entry application having a table with locations for designating:
a mobile or non-mobile platform for an advertisement
an advertisement title,
an advertisement description,
information for displaying a link to a landing page that includes a click-to-call telephone number that is a target of the advertisement content, the link, when selected, causes a device that is displaying the link to access the landing page and dial the click-to-call telephone number, and
one or more device-specific parameters for each advertisement, the one or more device specific parameters being associated with one or more devices that are is to receive the advertisement content wherein the one or more device specific parameters are indicative of the one or more devices being configured to properly display the advertisement content and comprise a parameter that specifies a platform associated with the one or more devices and a parameter that identifies types of mark-up languages supported by the one or more devices;
receiving, by the one or more processing devices, a request for content from a user of one or more devices;
determining, by the one or more processing devices, device-specific parameters for a device associated with the request; and
reformatting, by the one or more processing devices, one or more of the one or more advertisements so that the one or more advertisements can be used on a different platform, the different platform being the platform associated with the device, wherein reformatting includes truncating text included in a given advertisement and receiving one or more additional advertiser constraints related to presentation of the given advertisement to a subset of the devices associated with the different platform.

11. The method of claim 10, wherein the device-specific parameter includes an identification of a device model.

12. An Internet-based content delivery system, comprising:
memory storing an advertisement database comprising one or more advertisements;
an interface, connected to a network, to receive one or more requests for web-related content from a requester device;
one or more processing devices configured to:
receive, using an advertisement filter module in communication with the interface, information relating to a request that indicates one or more device specific parameters of a requester device, the device specific parameters identifying a telecommunications carrier associated with the requester device and being indicative of the requester device being configured to properly display advertisement content of the one or more advertisements, the device specific parameters further identifying types of mark-up languages supported by the requester device and specifying a platform associated with the requester device, wherein the platform is one of a mobile platform or a non-mobile platform;
reformat one or more of the one or more advertisements so that the one or more advertisements can be used on a different platform, the different platform being the platform associated with the requester device, wherein reformatting includes truncating text included in a given advertisement and receiving one or more additional advertiser constraints related to presentation of the given advertisement to a subset of devices associated with the different platform; and
select, from the advertisement database, one or more advertisements that are for transmission to the requester device and that have parameters that match the one or more device specific parameters of the requester device; and
an interface, connected to a network, to provide a number of the selected one or more advertisements for presentation by the requester device, the number of provided advertisements being a function of the device specific parameters, the request, and the additional advertiser constraints.

13. The system of claim 12, wherein the parameters of the one or more advertisements are advertiser-selected parameters.

14. The system of claim 12, further comprising an ad manager module configured to accept advertising content and device-related restrictions on delivery of advertisements from advertisers who submit the advertisements.

15. The system of claim 12, wherein the advertisements each comprise an advertisement title, an advertisement description, and an advertisement URL.

16. The system of claim 12, wherein the advertisement filter module is configured to identify IP address information associated with the request and to filter content associated with the IP address information.

17. The system of claim 16, wherein the IP address information associated with the request comprises a wireless service provider IP address.

18. An Internet-based content delivery system, comprising:
memory storing an advertisement database comprising one or more advertisements directed to mobile devices, the advertisement database including locations for entry of:
an advertisement title,
an advertisement description,
an advertisement URL, and
one or more device-specific parameters for each advertisement, the one or more device-specific parameters being associated with one or more devices that are to receive the advertisement, wherein the one or more device specific parameters are indicative of the one or more devices being configured to properly display the one or more advertisements and comprise a parameter that identifies types of mark-up languages supported by the one or more devices, and a platform associated with the one or more devices, wherein the platform is one of a mobile platform or a non-mobile platform;
one or more processing devices for receiving a request for content from a user of the one or more devices;
one or more processing devices for determining device specific parameters for a device associated with the request;
one or more processing devices for reformatting one or more of the one or more advertisements so that the one or more advertisements can be used on a different platform, the different platform being the platform associated with the device, wherein reformatting includes truncating text included in a given advertisement and receiving one or more additional advertiser constraints related to presentation of the given advertisement to a subset of the devices associated with the different platform; and
one or more processing devices for determining one or more advertisements from the advertisement database to be transmitted to the device based on the device-specific parameters, the request, and the additional advertiser constraints,
wherein the system is programmed to provide a number of advertisements for presentation on the device, the number of provided advertisements being a function of an ability of the device to display content.

* * * * *